United States Patent [19]

Fischer

[11] Patent Number: 4,466,763
[45] Date of Patent: Aug. 21, 1984

[54] RETAINING DEVICE FOR AXIALLY RETAINING A PIN, SHAFT OR THE LIKE

[76] Inventor: Max Fischer, Hanfrose 3, 8055 Zürich, Switzerland

[21] Appl. No.: 227,776

[22] Filed: Jan. 23, 1981

[30] Foreign Application Priority Data

Jan. 24, 1980 [CH] Switzerland .................. 585/80

[51] Int. Cl.³ .............................................. F16B 19/02
[52] U.S. Cl. ..................................... 411/521; 411/352
[58] Field of Search ............... 411/521, 520, 513, 511, 411/351, 352, 356

[56] References Cited

U.S. PATENT DOCUMENTS

| | | | |
|---|---|---|---|
| 326,229 | 9/1885 | Lowe | 411/520 X |
| 2,408,340 | 9/1946 | Poupitch | 411/520 |
| 3,006,230 | 10/1961 | McCauley | 411/520 X |
| 3,100,555 | 8/1963 | Ashton | 403/292 X |
| 3,263,552 | 8/1966 | Fischer . | |

FOREIGN PATENT DOCUMENTS

| | | |
|---|---|---|
| 2413982 | 3/1978 | Fed. Rep. of Germany . |
| 3000759 | 7/1980 | Fed. Rep. of Germany . |
| 1365489 | 5/1964 | France ................... 411/520 |

Primary Examiner—Richard J. Scanlan, Jr.
Attorney, Agent, or Firm—Fleit, Jacobson, Cohn & Price

[57] ABSTRACT

A retaining device has a central body adapted to be radially inserted into a bore or recess of a machine member to be retained. Lateral legs of the device are integral with the body and intended for at least partial engagement with the machine member to be retained. The body consists of a tube. The legs extend from one end of the tube on opposite sides.

7 Claims, 6 Drawing Figures

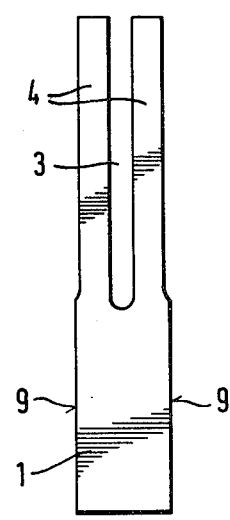
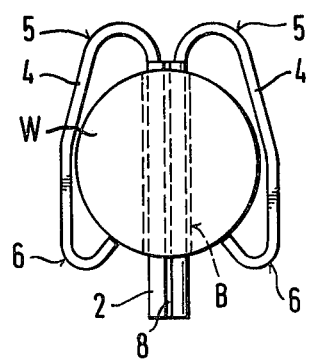
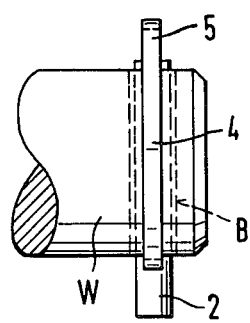
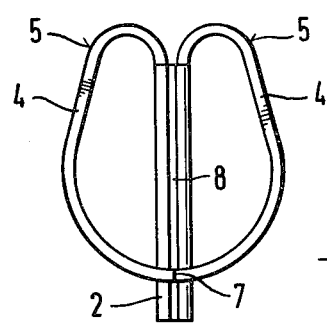
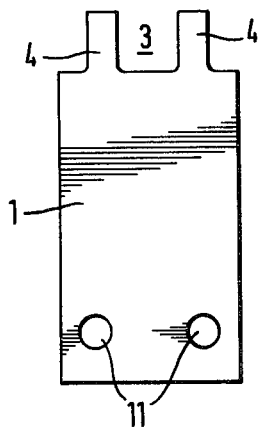
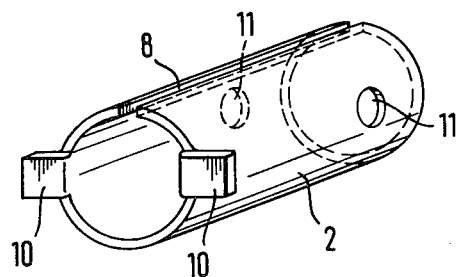

RETAINING DEVICE FOR AXIALLY RETAINING A PIN, SHAFT OR THE LIKE

This invention relates to a retaining device for axially retaining a pin, shaft or the like machine member in another machine member, comprising a central body which is adapted to be radially inserted into a bore or recess of the machine member to be retained and lateral legs are integral with the body and intended for an at least partial engagement with the machine member to be retained.

U.S. Pat. No. 3,263,552 describes such a retaining device, which consists of bent steel wire having a portion which in the middle is reversely bent parallel to itself and constitutes the central body. The end portions of the steel wire are bent to form the legs, which partly embrace the machine member to be retained. That known retaining device has proved satisfactory but its manufacturing costs are excessive in view of the fact that such retaining devices are mass-produced items which are calculated to fractions of a cent.

It is an object of the invention to provide a retaining device which is of the kind described first hereinbefore and has equally good retaining capabilities but can be made more economically at lower cost.

In a retaining device of the kind described first hereinbefore this object is accomplished in that the body consists of a tube and the legs extend from one end of the tube on opposite sides.

In a preferred embodiment of the invention, the retaining device consists of a sheet metal stamping having fingerlike extensions and a substantially rectangular main portion that has been bent to form a tubular body whereas the extensions are laterally bent from the body to form the legs. The blanks for making the retaining device according to the invention can be stamped in a simple and fast operation from sheet metal, even from waste sheet metal. For this reason even the blanks from which the retaining devices are subsequently made by bending are less expensive than the steel spring wire. The body which constitutes the retaining element can be bent to form a tube on usual automatic machines for bending sheet metal so that the final shape can be imported to the retaining device in a simple manner in that the extensions forming the legs are bent as desired before the retaining device is hardened.

A retaining device consisting of a sheet metal stamping is known, e.g., from German Early Disclosure No. 24 13 982. That known retaining device consists substantially of a flat sheet metal blank, which has properties differing from those of a retaining device according to the invention, which resembles a retaining device of bent spring wire.

It is known from German Early Disclosure No. 30 00 759 to make a pin by roll-forming a sheet metal blank. But such pins cannot be used as retaining devices and have no locking means consisting of bent legs.

According to a preferred further feature of the invention, the legs are laterally curved in arcuate shape in a plane which is common to the mandrel and extend past the machine member to be retained beyond that diametral line or the like which is at right angles to the body and the end portions are bent inwardly in hook shape. The retaining action of the locking means consisting of the legs which embrace the machine member to be retained can be increased in that the end portions of the legs are angled to contact the machine member to be retained or to engage the latter under initial stress.

If the retaining devices are intended to be fixed at the end portion of a pin, the ends of the legs, which completely surround the machine member to be retained may be joined to one another so that the retaining device can only be pulled off if the legs, which are joined to form a locking ring, are lifted. The legs are suitably joined to one another by welding.

In addition, each leg may be provided on its side facing the machine member to be retained with the lug for bearing on said machine member. Because such lugs bear resiliently on the machine member, such retaining device according to the invention will also take up axial play and will not chatter.

The main portion of the sheet metal stamping may have corrugated side edges so that a corrugated slot is formed in the body. Bodies having corrugated slots can be more easily slidably inserted into a bore.

In another embodiment of the invention the two legs are short and are bent approximately at right angles from the tubular body, which is formed near its other end with bores or holes which are opposite to and aligned with one another. A locking pin or a cord to be lead-sealed is threaded through such holes to prevent the retaining device from falling out of the machine member to be retained.

Embodiments of the invention will now be explained more fully and by way of example with reference to the drawing, in which FIG. 1 is a top plan view showing a sheet metal blank which can be bent to form the retaining device, FIG. 2 is a top plan view showing a first embodiment of the retaining device fitted on a shaft, FIG. 3 is a side elevation showing the retaining device of FIG. 2, FIG. 4 is a top plan view showing a second embodiment of the retaining device with legs joined to form a locking ring.

FIG. 5 is a top plan view showing a sheet metal blank for a third embodiment of the retaining device and FIG. 6 is a perspective view showing a retaining device made by bending the sheet metal blank of FIG. 5.

The stamped sheet metal blank shown in FIG. 1 has a substantially rectangular lower main portion 1, which has straight side edges 9. Parallel fingerlike extensions 4 are integral with and extend from the short top end of the main portion 1 of the sheet metal blank and are spaced apart to define a gap 3 between them. The gap 3 has such a width that when the main portion 1 has been bent into the shape of a substantially cylindrical tube the extensions are disposed at the end of the tube on opposite sides thereof.

FIG. 2 shows the retaining device which has been made by bending from the blank of FIG. 1. The tubular body 2 made by bending from the main portion 1 of the sheet metal blank has been slidably fitted into the bore B of the shaft W. The extensions 4 have been laterally bent to form retaining legs. Each leg comprises a first arcuate portion 5 that is curved toward the end of the body 2 and after that arcuate portion extends past the shaft W whereas the arcuate end portions 6 are reversely curved and directed approximately toward the center line of the shaft. The arcuate end portions 6 form hooks having retaining edges, which prevent an unintended stripping of the retaining device.

The retaining device shown in FIGS. 2 and 3 can be fitted in a simple manner. It will be sufficient to introduce the body 2, which constitutes the retaining member, by hand into the bore B so that the angled hook-shaped end portions 6 slide on the periphery of the shaft under the pressure applied to the body 2 and are thus spread apart until they spring into their locking position on the opposite side of the shaft. The fitted retaining device virtually straddles the shaft with the body 2 acting as a retaining member and the legs acting as locking members, which lock the retaining device in position so that the shaft cannot be axially displaced in the other machine member, which is not shown.

The retaining device can be pulled in a simple manner from the shaft W. It will be sufficient to bend the legs radially outwardly and to pull the body 2 out of the bore B of the shaft W.

In the embodiment of the retaining device shown in FIG. 4, the ends of the legs 4 are joined by a seam weld 7 so that the legs 4 constitute a locking ring, which surrounds an end portion of a shaft or pin.

In the embodiment shown in FIGS. 5 and 6, the extensions 4 forming the legs 10 are short so that they constitute stops, which prevent a slipping of the body 2 through the bore. Near the end opposite to the extensions 4, the body 2 is formed with two bores 11, which are opposite to and aligned with each other and through which a cotter pin, retaining wire or a cord to be lead-sealed can be threaded.

The longitudinal slot 8 of the tubular body may be straight or corrugated.

What is claimed is:

1. A retaining device for axially retaining a pin, shaft or a first machine member in a second machine member, said retaining device comprising:
   a central body which is adaptable to be radially inserted into a bore or recess of said first machine member;
   lateral legs integral with said body intended for at least partial engagement with said first machine member;
   said legs laterally curved in arcuate shape in a plane which is common to said central body;
   said legs extending past said first machine member beyond a diametral line at right angles to said body;
   end portions of said legs bending inwardly in hooked shape; and
   said body consisting of a tube with said legs extending from one end of the tube on opposite sides.

2. A retaining device according to claim 1, characterized in that it consists of a sheet metal stamping having fingerlike extensions and a substantially rectangular main portion that has been bent to form a tubular body whereas the extensions are laterally bent from the body to form the legs.

3. A retaining device according to claim 2, characterized in that the end portions of the legs are angled to contact the machine member to be retained or to engage the latter under initial stress.

4. A retaining device according to claim 1, wherein said retaining device consists of plastic material.

5. A retaining device for axially retaining a pin, shaft or a first machine member in a second machine member, said retaining device comprising:
   a central body which is adaptable to be radially inserted into a bore or recess of said first machine member;
   lateral legs integral with said body intended for at least partial engagement with said first machine member;
   said legs completely surrounding said first machine member;
   said legs joined to one another;
   said legs extending past said first machine member beyond a diametral line at right angles to said body; and
   said body consisting of a tube with said legs extending from one end of the tube on opposite sides.

6. A retaining device according to claim 5, wherein said retaining device consists of a sheet metal stamping having fingerlike extensions and a substantially rectangular main portion that has been bent to form a tubular body, said extensions being laterally bent from said body to form legs.

7. A retaining device according to claim 5, wherein said retaining device consists of plastic material.

* * * * *